United States Patent [19]
Young et al.

[11] Patent Number: 5,424,923
[45] Date of Patent: Jun. 13, 1995

[54] QUICK RELEASE VEHICLE HEADLAMP ARRANGEMENT

[75] Inventors: Paul Young, Muncie; Randall J. Smith, Anderson; William E. Nagengast, Anderson; Brian E. Witte, Anderson, all of Ind.

[73] Assignee: General Motors Corporation, Detroit, Mich.

[21] Appl. No.: 323,307

[22] Filed: Oct. 14, 1994

[51] Int. Cl.⁶ ............................................. B60Q 1/06
[52] U.S. Cl. .................................. 362/66; 362/284; 362/289; 362/421
[58] Field of Search ............... 362/66, 277, 282, 283, 362/284, 285, 287, 289, 324, 420, 421, 449, 424

[56] References Cited

U.S. PATENT DOCUMENTS

| 4,621,307 | 11/1986 | Weber | 362/66 |
| 4,689,725 | 8/1987 | Saijo et al. | 362/66 |
| 4,901,208 | 2/1990 | DePetro | 362/66 |

*Primary Examiner*—Stephen F. Husar
*Attorney, Agent, or Firm*—Ernest E. Helms

[57] ABSTRACT

A vehicle headlamp assembly is provided which includes a bulb; a reflector housing mounting the bulb; at least one rod pivotally connected to the housing; an adjuster body encircling the rod and threadably engaged therewith, the adjuster body having an insertion end generally opposite the reflector housing and a slot on the insertion end; a vehicle panel with an aperture for receipt of the adjuster body insertion end; and a slider mounted for relative movement with respect to the panel. The slider has an aperture with a first dimension for receipt of the insertion end of the adjuster body, and the slider aperture has a second end with a smaller dimension for encircling the adjuster body adjacent the slot. Thus, movement of the slider from a first position aligning the slot aperture first end with the panel aperture allows insertion or removal of the insertion end of the adjuster body, and movement of the slider to a second position allowing the slider aperture second end to align with the panel aperture retains the adjuster body with the vehicle panel, thereby attaching the reflector body to the vehicle.

5 Claims, 3 Drawing Sheets

QUICK RELEASE VEHICLE HEADLAMP ARRANGEMENT

FIELD OF THE INVENTION

The field of the present invention is that of vehicle headlamp assemblies for automotive vehicles, particularly composite-type headlamp assemblies having replaceable bulbs.

BACKGROUND OF THE INVENTION

Many modern vehicular headlamps with aerodynamic styling provide for smaller lenses and replaceable halogen bulbs. The replaceable bulb arrangement permits the lens and reflector housing to remain in place on the vehicle and only requires that the smaller halogen bulb be replaced should a bulb burn out and require servicing. Most replaceable bulb headlamps provide for room behind the headlamp for bulb servicing. When the bulb burns out, room for a hand must be provided to remove the old bulb and for insertion of the replacement bulb. The servicing requirement often results in access holes in the support panels or extra room being provided for access from the top of the headlamp after a vehicle hood is raised.

Many newer vehicle stylings have smaller hoods, with the headlamp being placed under the fender panel, restricting service access. To attach a reflector housing to a panel connected to the vehicle, many headlamp assemblies are provided with special attaching screws that must be removed to release the headlamp for servicing. It is desirable to provide a headlamp attaching system that does not require the utilization of special tools and which ensures continued proper aim of the headlamp assembly, does not require hand access directly behind the reflector housing and is safe and easy for servicing, allowing a vehicle owner to service the headlamp without resorting to a mechanic or dealer repair specialist. Additionally, the attachment system should allow a minimum space requirement, thereby minimizing weight and maximizing positive aerodynamic capabilities to enhance the environmental efficiency of the vehicle.

SUMMARY OF THE INVENTION

The present meets the above-noted needs by providing a headlamp assembly which can be connected to or removed from a fixed panel in the vehicle by simply raising or lowering a slider connecting the fixed panel to the vehicle.

Additional advantages of the present invention will be apparent to those skilled in the art as the invention is revealed in the accompanying drawings and detailed description.

DESCRIPTION OF THE PREFERRED EMBODIMENT

Figure 1:
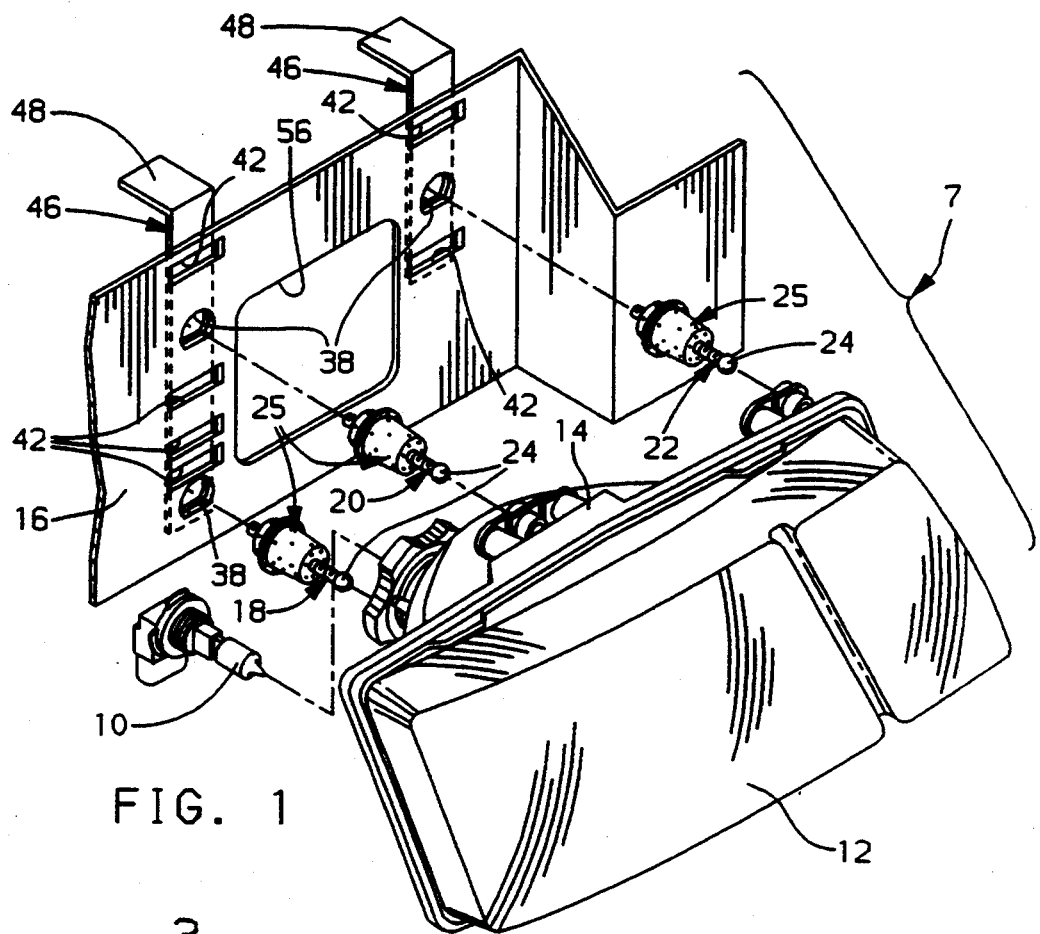
FIG. 1 is an exploded view of a vehicle headlamp mounting arrangement according to the present invention.

Referring to FIGS. 1 through 4, the arrangement of an aimable vehicle headlamp assembly 7 of the present invention has a bulb 10 for providing a source of illumination. In front of the bulb is a lens 12 which in the embodiment shown may be mounted to a reflector housing 14. The reflector housing 14 mounts the bulb 10.

Connecting the reflector housing 14 to a panel 16 fixed to the vehicle are a fixed pivot rod 18, a vertical adjuster rod 20 and a horizontal adjuster rod 22. Each adjuster rod has on its end a ball 24 which is typically connected to the reflector housing 14 by holding the ball 24 in a socket, which allows the ball 24 to move in a pivotal and rotative manner. On the opposite end of the rods 18, 20 and 22 will be a hexagonal flat or a hex insert for insertion of an allen wrench (not shown).

Figure 2:
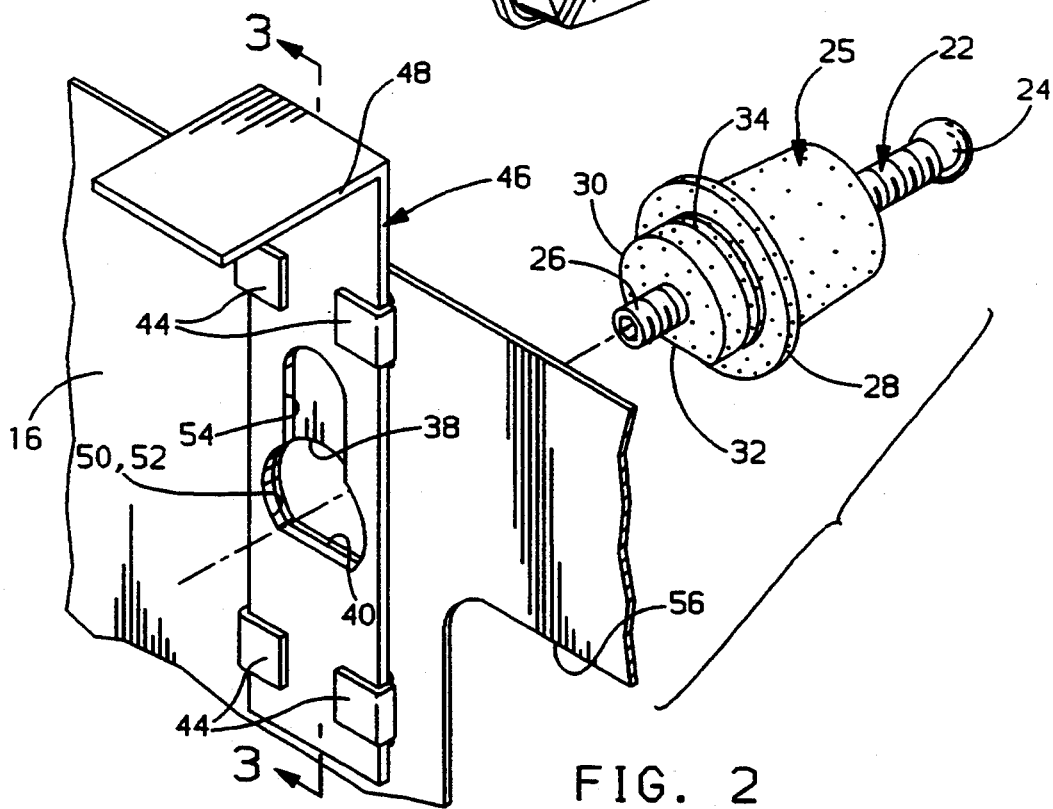
FIG. 2 is an enlarged view of a vehicle panel, slider adjuster body and rod of the present invention with the slider in a first position allowing removal or attachment of the adjuster body to the vehicle panel.
Figure 3:
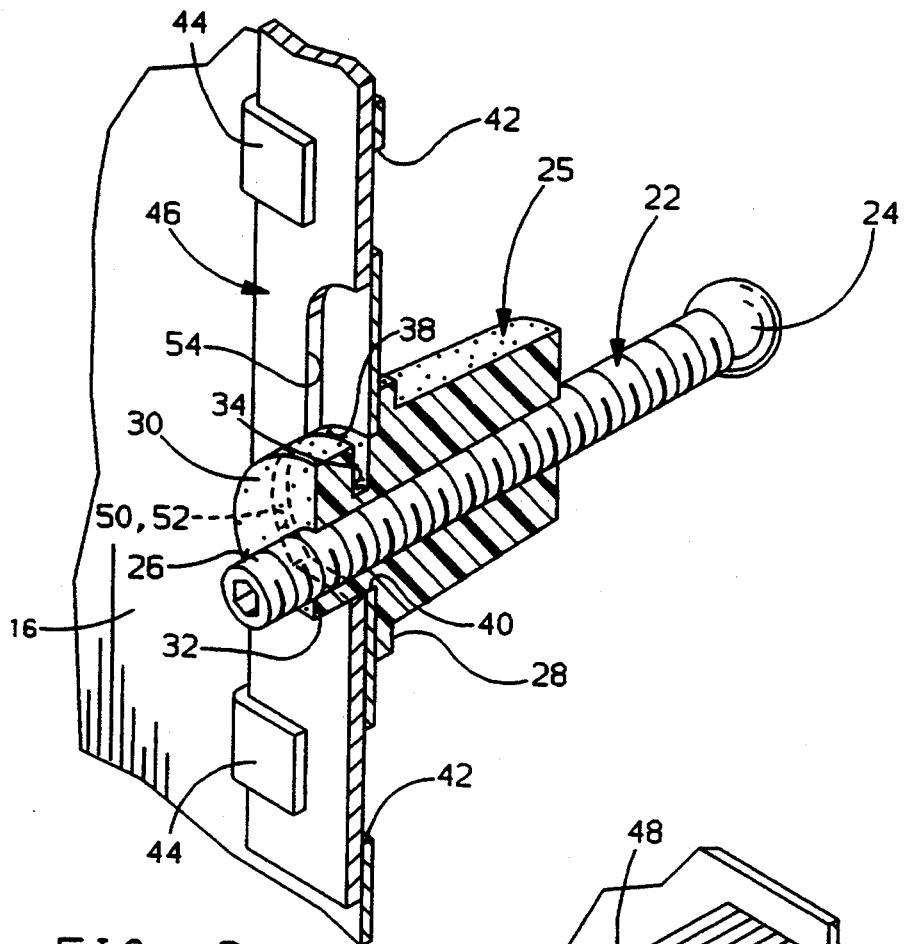
FIG. 3 is an enlarged view similar to that of FIG. 2 showing the adjuster body being inserted within an aperture of the vehicle panel and the vehicle slider.
Figure 4:
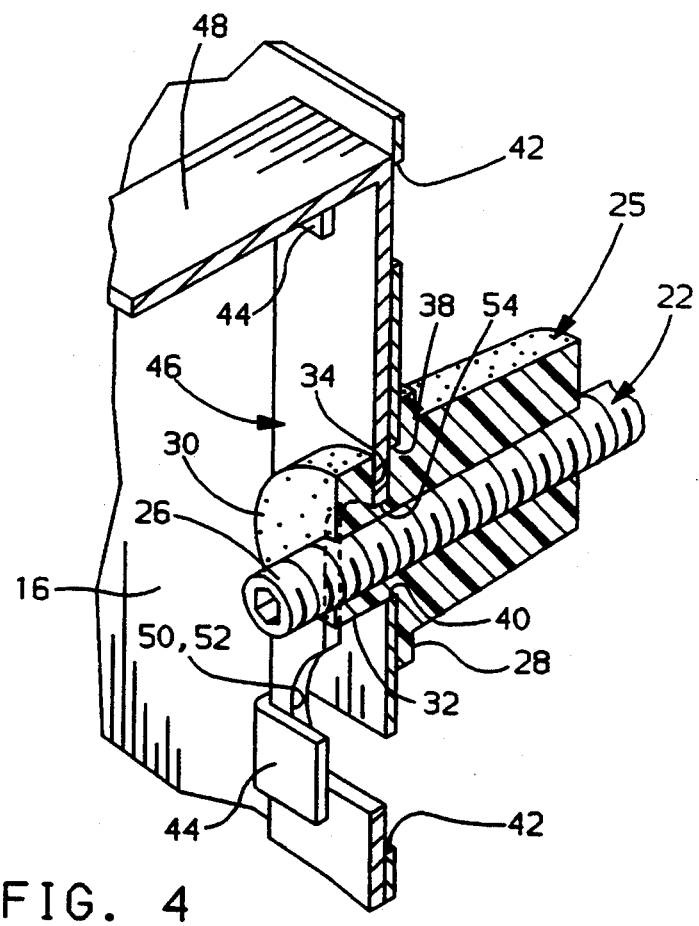
FIG. 4 is a view similar to that of FIG. 3 showing the slider being relocated downwardly to a second position, allowing a second portion of the slider aperture to be encircled around the adjuster body within the slot of the same, thereby causing the adjuster body and associated rod to be fixably connected to the vehicle panel.

The adjuster bodies and associated rods are essentially identical; therefore, in the interest of brevity, only one is explained in further detail. Each rod is encapsulated by a polymeric, typically 13% glass-filled nylon plastic material, adjuster body 25. The adjuster body 25 has an interference fit with a threaded portion 26 of the rod 22. Additionally, the adjuster body 25 has a flange 28. As shown in FIGS. 2 through 4, to the left of the flange 28 is an insertion end 30. The insertion end has a flat 32 and an annular slot 34.

Fixably connected either in a single piece as shown or in multiple pieces to the vehicle body or frame is the panel 16. The panel 16 has apertures 38 corresponding to each adjuster body 25. Each panel aperture 38 also has a flat 40 generally corresponding to the flat 32 provided on the adjuster body 25. The panel 16 also has a series of punch-out apertures 42 forming tab members 44. Mounted for relative movement with respect to the vehicle panel 16 by tabs 44 is a slider 46. The slider is typically fabricated from a steel stamping or 13% glass-filled nylon. The slider 46 has a slip or running fit within the tabs 44. The slider 46 has a tab 48 to allow it to be grabbed by the vehicle operator. As shown in FIG. 1, the tab 48 can be for a single adjuster body as the right-hand one or for multiple adjuster bodies as the left-hand one. The two tabs 48 may be optionally joined together.

For each adjuster body 25 and each aperture 38 of the vehicle panel 36, the slider has an aperture 50. Aperture 50 has a lower dimension 52 quite similar to the aperture 38 of the vehicle panel 16 and a second smaller dimension 54. As shown in FIGS. 2 and 3, the slider is shown in the first position placing its first aperture dimension 52 in general alignment with the aperture 38, allowing for insertion or removal of the insertion end 30 of the adjuster body 25.

As shown in FIG. 4, the slider has been moved downward to a second position, causing the second dimension 54 of the aperture 50 to encircle the adjuster body 25 within the annular slot 34 with a slight interference fit. In the second position of the slider, the adjuster body is fixably held to the vehicle panel 16, thereby holding the reflector body 14 in place. It should be noted that to optimize the invention, the vehicle panel 16 has a center aperture 56 allowing a portion of the reflector housing 14 to be inserted therein to minimize space requirements. The flat 40 of the panel can be deleted if so desired, and tabs connected to the vehicle panel or to the slider can be utilized to make sure that the connection of the adjuster body with the panel is a nonrotative one.

Aiming of the headlight assembly 7 can occur during attachment of the headlamp housing 14 to the vehicle body by utilizing a wrench and turning the respective rods 20 and 22.

Figure 5:
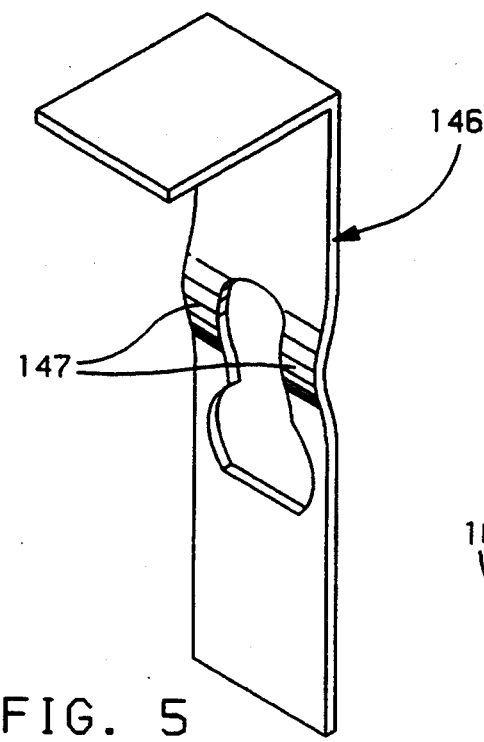
FIG. 5 is a view of an alternative preferred embodiment slider.
Figure 6:
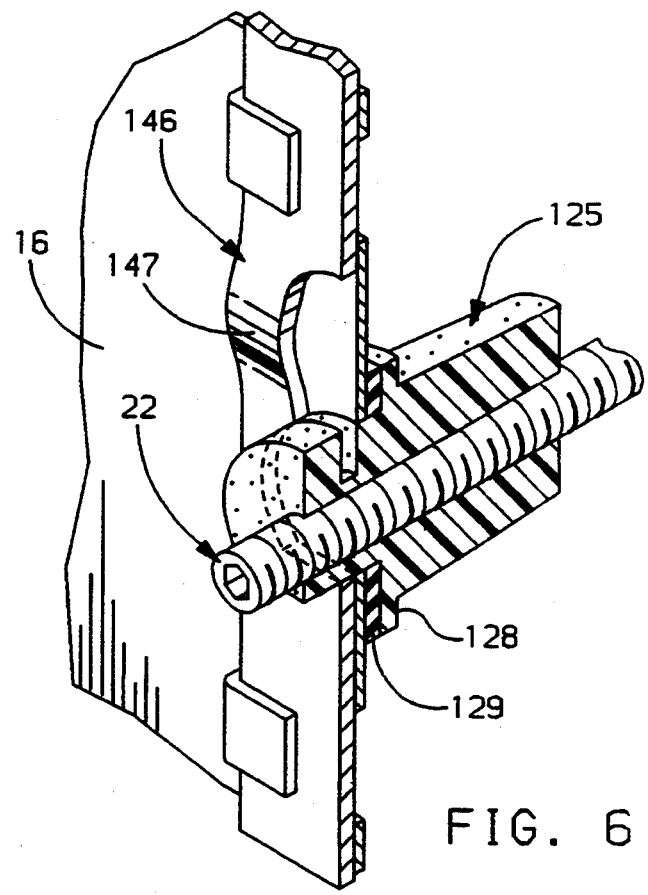
FIGS. 6 and 7 are views similar to FIG. 3 of alternative preferred embodiments.
Figure 7:
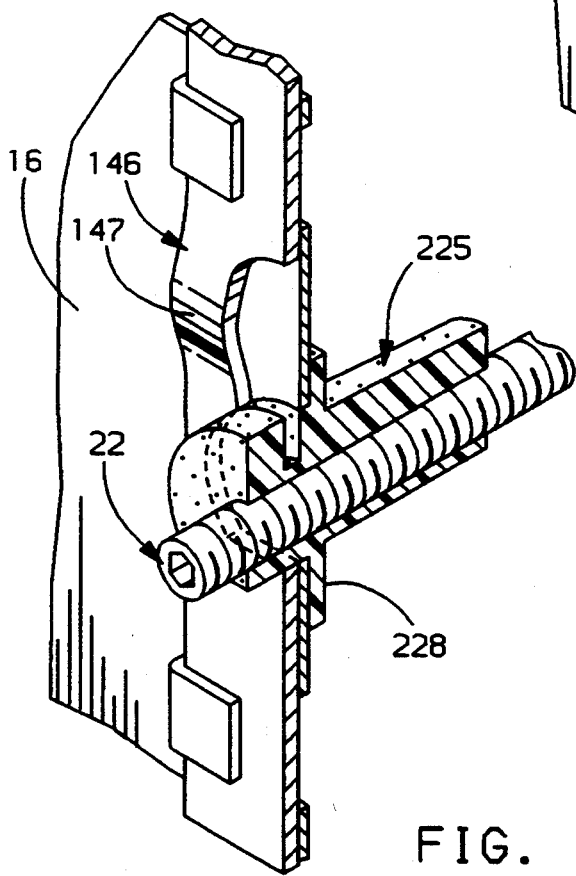

Referring additionally to an alternative embodiment shown in FIGS. 5, 6 and 7, to aid in retention of the adjuster body 125, a slider 146 with a bowed midsection 147 provides a pull on the adjuster body 125 in a direction parallel to the rod 22. Since the adjuster body 125 is relatively inflexible, a more compliant elastomeric or other suitable material pad 129 is added adjacent the flange 128 for abutting engagement with the panel 16. In still another embodiment, the adjuster body 225 has a smaller main dimension and an enlarged flange 228 to provide for enhanced flexibility.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. An arrangement of an aimable vehicle headlamp assembly fixably connected to a fixed portion of a vehicle, the arrangement comprising:
   a bulb providing a source of illumination;
   a reflector housing mounting the bulb;
   at least one rod pivotally connected to the housing;
   an adjuster body encircling the rod and threadably engaged therewith, the adjuster body having an insertion end generally opposite the reflector housing and a slot on the insertion end;
   a vehicle panel with an aperture for receipt of the adjuster body insertion end; and
   a slider mounted for relative movement with respect to the panel, the slider having an aperture with a first dimension for receipt of the insertion end of the adjuster body and the slider aperture having a second end with a smaller dimension for encircling the adjuster body adjacent the slot, wherein movement of the slider from a first position aligning the slot aperture first end with the panel aperture allows insertion or removal of the insertion end of the adjuster body and movement of the slider to a second position allowing the slider aperture second end to align with the panel aperture retains the adjuster body with the vehicle panel, thereby attaching the reflector body to the vehicle.

2. A vehicle headlamp arrangement as described in claim 1 wherein the adjuster body is held to the vehicle panel in a nonrotative fashion.

3. A vehicle headlamp arrangement as described in claim 1 wherein one slider has two apertures for alignment with two apertures in the vehicle panel for receipt of two adjuster bodies and associated rods for attaching the reflector body to the vehicle panel at two locations.

4. A vehicle headlamp arrangement as described in claim 1 wherein the slider has a bowed midportion to provide a spring force upon the adjuster body.

5. A vehicle headlamp arrangement as described in claim 1 having a compressible flange for abutting engagement with the fixed portion of the vehicle.

* * * * *